Figure 1:
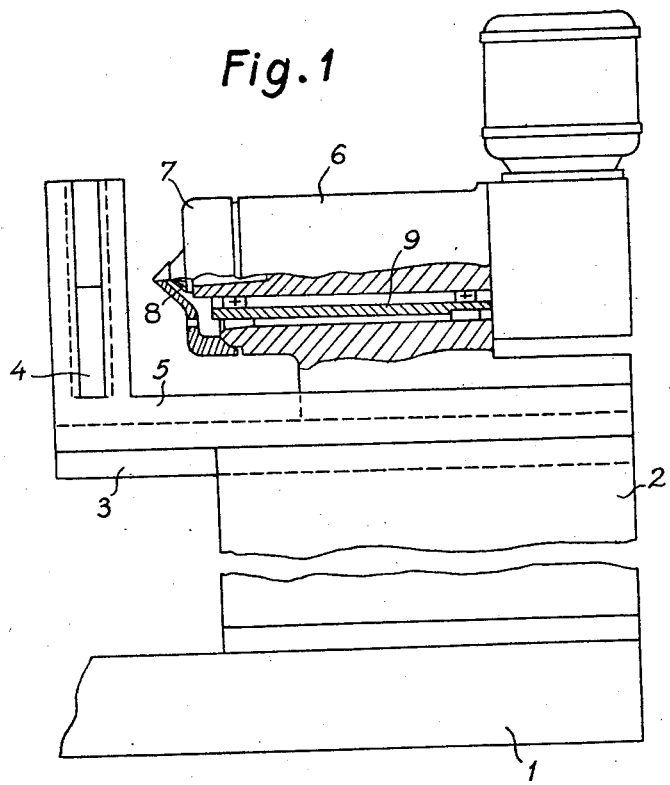

May 5, 1964            M. CIRET ETAL           3,131,600
DEVICES FOR TRUING UP THE MACHINING CENTRES OF AXLES, ADAPTABLE
NOTABLY TO A MACHINE FOR SURVEYING RAILWAY ROLLING-STOCK
AXLES IN THEIR ASSEMBLED CONDITIONS
Filed April 18, 1963

Inventors
Maurice Ciret
Rene Mouchet
By Stevens, Davis, Miller & Mosher
Attorneys

United States Patent Office 3,131,600
Patented May 5, 1964

3,131,600
DEVICES FOR TRUING UP THE MACHINING CENTRES OF AXLES, ADAPTABLE NOTABLY TO A MACHINE FOR SURVEYING RAILWAY ROLLING-STOCK AXLES IN THEIR ASSEMBLED CONDITIONS
Maurice Ciret, Colombes, and René Mouchet, Nanterre, France, assignors to Societe Nationale des Chemins de Fer Francais, Paris, France, a corporation of France
Filed Apr. 18, 1963, Ser. No. 273,923
Claims priority, application France May 9, 1962
2 Claims. (Cl. 90—14)

It is known in railway systems to remove and recondition the axles of rolling stock when the tyres thereon have attained the maximum degree of wear fixed by regulations.

To this end, the axles are turned between centres, the machining centres formed at either end of the axle body constituting the reference marks. During the axle operation the machining centres are sometimes subjected to deformation and/or oxidation, and must therefore be trued up before commencing the tyre reshaping operation.

This work is performed as a rule by resorting to one of the following methods:

(1) A tapered milling cutter is carried by a crankshaft and the truing operation is effected by simple guess work, (2) A tapered milling cutter is rotatably driven from a motor in a mounting centred "at best" on the spindle.

In these known devices the milling cutter follows and sometimes amplifies the deformation of the machining centres to be trued up. In order to improve the precision obtainable with these conventional methods the operation must be performed on a lathe, the axle being carried by back-rests and centred by means of its spindles. However, this operation is attended by difficult handling and long holdups of the lathe, a costly machine tool.

To avoid this drawback a so-called "bench" machine was designed specially for surveying defects of railway rolling-stock axles withdrawn from service. This invention is concerned more particularly with the adaptation of milling-cutter devices designed for truing up machining centres to bench-type surveying machines of the type broadly set forth hereinabove.

To survey two axles between centres a surveying machine comprises as a rule two axially-aligned and registering tail stocks, whereby the axes of their centres are merged into each other and serve as reference marks for the surveying operation.

This invention consists in incorporating in said tail stocks planetary devices for milling the machining centres disposed in axial alignment with the centres or points of said tail stocks.

Thus, the position of the axle remains unchanged, whether for surveying same or truing up its machining centres. With this arrangement the axle handling is greatly facilitated and the time necessary for performing these operations is reduced considerably.

The axle machining centres should be trued up concentrically to the axle spindles in order to minimize the quantity of metal removed when re-machining these spindles.

To this end, the survey machine is provided with a suitable precision centring device forming no part of this invention and adapted to bring the axle centre line in alignment with the working axis of the truing tools.

The truing up of machining centres is effected by using a milling cutter. To prevent this cutter from following the deformation of the centres to be trued up, a moderately eccentric planetary motion is imparted to the cutter.

Thus, the milling operation is accomplished by generation, the thickness of the metal shavings is kept to a substantially constant value due to the gradual feed of the tool; therefore, during the final pass the milling cutter stress is substantially eliminated.

To change from the centre truing-up operation to the axle surveying operation the tail-stocks incorporating the milling tools are moved away from each other and these tools are fitted with detachable centres having their centre lines coincident with the working axis of said milling cutters.

Figure 2:
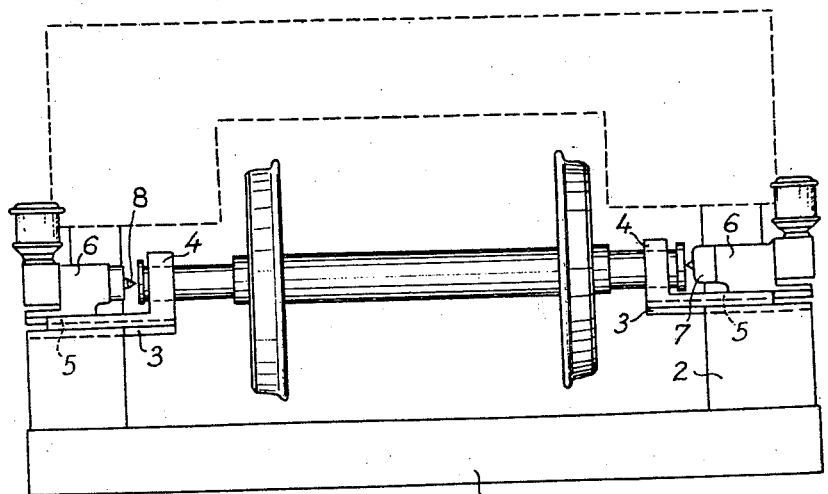

A typical form of embodiment of the invention will now be described by way of example with reference to the accompanying drawing, in which:

FIGURE 1 is a part-sectional side-elevational view showing a centring and truing tail-stock constructed according to the teachings of this invention, and FIGURE 2 is a comprehensive view showing diagrammatically an axle surveying machine equipped with the device illustrated in FIG. 1.

In this form of embodiment each tail stock for centring the axles and truing-up the axle machining centres comprises essentially:

(a) A bracket 2 secured on either end of the bed 1 of the survey bench;

(b) A lower guideway 3 supporting the centring device 4;

(c) An upper guideway 5 receiving the milling head 6;

(d) A detachable cover 7 enclosing the machining device.

The milling head 6 associated with the upper guideway 5 comprises:

(e) A tapered milling cutter 8 having the same cone as the machining centre to be trued up, this cutter being rotatably driven about its axis at the speed corresponding to the proper rate of cutting; and (f) A cutter-supporting sleeve 9 revolving at a low (feed) speed about an axis parallel to the cutter axis.

With this arrangement, a planetary motion is imparted to the cutter 8 and the machined surface thus generated is a cone of same angle as the milling cutter but of a radius increased by the relative spacing or eccentric shift between the axis of rotation of the cutter and that of said sleeve.

The axis of the cone thus generated is adjusted to merge with that of the axle centred with respect to the spindles thereof.

If desired, the above-described device may be used independently of a survey bench. Thus, for example, the device may be used on an axle turning lathe or on a machine designed for centring operations only. In this last instance, it is not necessary to provide detachable centres.

Although this invention has been described and illustrated with reference to preferred embodiments thereof, it will be understood by anybody conversant with the art that various modifications and variations may be resorted to without departing from the spirit and scope of the invention as set forth in the appended claims.

We claim:

1. Device for truing-up the machining centres of axles, notably of railway rolling stock, characterized in that it consists essentially of two machining tail-stocks each slidably mounted on guideways slidably mounted in turn on a fixed support and carrying a device for centring the axle spindle concerned, each tail stock comprising a tapered milling cutter of same angle as the machining centres to be trued-up and to which a movement of rotation is imparted about its axis to provide the necessary cutting speed, and a cutter-carrying sleeve revolving at a lower speed to provide the rate of feed of said cutter about an axis parallel to that of said cutter, whereby a planetary motion is imparted to said cutter.

2. Device according to claim 1, characterized in that it can be fitted on a bench for surveying railway rolling-stock axles, and wherein there is provided to this end, for each tail stock, a detachable centre rigid with a support whereby said tail stock can be so capped that the axis defined by said centres when in position are strictly coincident with the axis of an axle as defined by its machining centres trued-up in the manner set forth in claim 1, said centres permitting of subsequently mounting said axle between centres for carrying out the operations devolved to the survey bench.

References Cited in the file of this patent

UNITED STATES PATENTS

| | | |
|---|---|---|
| 1,587,261 | White | June 1, 1926 |
| 2,534,531 | Rossmanith | Dec. 19, 1950 |
| 2,999,403 | Anderson | Sept. 12, 1961 |

FOREIGN PATENTS

| | | |
|---|---|---|
| 238,878 | Switzerland | Jan. 16, 1946 |

UNITED STATES PATENT OFFICE
CERTIFICATE OF CORRECTION

Patent No. 3,131,600                                               May 5, 1964

Maurice Ciret et al.

It is hereby certified that error appears in the above numbered patent requiring correction and that the said Letters Patent should read as corrected below.

In the grant, lines 2 and 3, for "assignors to Societe Nationale des Chemins de Fer Francais, of Paris, France, a corporation of France," read -- assignors of a part interest to Societe Nationale des Chemins de Fer Francais, of Paris, France, a corporation of France, --; lines 12 and 13, for "Societe Nationale des Chemins de Fer Francais, its successors" read -- Maurice Ciret and René Mouchet, their heirs or assigns, and Societe Nationale des Chemins de Fer Francais, its successors --; in the heading to the printed specification, lines 8 and 9, for "assignors to Societe Nationale des Chemins de Fer Francais, Paris, France, a corporation of France" read -- assignors of a part interest to Societe Nationale des Chemins de Fer Francais, Paris, France, a corporation of France --.

Signed and sealed this 6th day of July 1965.

(SEAL)
Attest:

ERNEST W. SWIDER                                          EDWARD J. BRENNER
Attesting Officer                                     Commissioner of Patents